United States Patent
Tanno et al.

(10) Patent No.: US 10,990,911 B2
(45) Date of Patent: Apr. 27, 2021

(54) DELIVERY ROUTE MANAGEMENT AND OPTIMIZATION

(71) Applicant: Target Brands, Inc., Minneapolis, MN (US)

(72) Inventors: Constantin Lorenzo Tanno, Minneapolis, MN (US); Troy David Eastlack, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 450 days.

(21) Appl. No.: 15/874,623

(22) Filed: Jan. 18, 2018

(65) Prior Publication Data
US 2019/0220785 A1    Jul. 18, 2019

(51) Int. Cl.
| | |
|---|---|
| *G06Q 10/08* | (2012.01) |
| *G06Q 10/04* | (2012.01) |
| *G01C 21/34* | (2006.01) |
| *G01C 21/36* | (2006.01) |

(52) U.S. Cl.
CPC ......... *G06Q 10/047* (2013.01); *G06Q 10/083* (2013.01); *G01C 21/343* (2013.01); *G01C 21/3626* (2013.01)

(58) Field of Classification Search
USPC .... 705/330, 332, 333, 335, 338, 26.9; 383/3
See application file for complete search history.

(56) References Cited

U.S. PATENT DOCUMENTS

| | | | |
|---|---|---|---|
| 5,897,629 A * | 4/1999 | Shinagawa | G06N 3/126 706/13 |
| 6,567,743 B1 | 5/2003 | Mueller et al. | |
| 7,062,380 B2 * | 6/2006 | Oonishi | G01C 21/3461 340/995.19 |
| 9,884,632 B2 * | 2/2018 | Hecht | G08G 1/096827 |
| 10,502,575 B2 * | 12/2019 | Uno | G01C 21/3626 |
| 2003/0093217 A1 | 5/2003 | Petzold et al. | |

(Continued)

OTHER PUBLICATIONS

'descartes.com' [online] "Delivery Route Planning Software," Retrieved on Nov. 20, 2017, Retrieved from URL <https://www.descartes.com/documents/overview-descartes-route-planning-solutions, 9 pages.

(Continued)

*Primary Examiner* — Akiba K Robinson
(74) *Attorney, Agent, or Firm* — Fish & Richardson P.C.

(57) ABSTRACT

In some implementations, a method performed by data processing apparatuses includes identifying a first delivery route that includes delivery stops at multiple locations within a first geographic region, and identifying a second delivery route within a second geographic region. The first delivery route can be assigned to a first carrier that is designated to deliver orders within the first geographic region, and the second delivery route can be assigned to a second carrier that is designated to deliver orders within the second geographic region. An additional order can then be identified that is requested to be delivered to a location within the first geographic region. The second delivery route can be modified to include the additional delivery stop for the additional order, including assigning the additional order to the second carrier even though the second carrier is designated to deliver orders within the second geographic region.

21 Claims, 7 Drawing Sheets

(56) References Cited

U.S. PATENT DOCUMENTS

| | | | | |
|---|---|---|---|---|
| 2004/0158393 | A1* | 8/2004 | Oonishi | G01C 21/3461 |
| | | | | 701/411 |
| 2010/0211309 | A1* | 8/2010 | Sugawara | G08G 1/096844 |
| | | | | 701/533 |
| 2010/0274610 | A1* | 10/2010 | Andersen | G06Q 10/087 |
| | | | | 705/28 |
| 2015/0032367 | A1* | 1/2015 | Stenneth | G01C 21/32 |
| | | | | 701/430 |
| 2017/0024789 | A1* | 1/2017 | Frehn | G06Q 30/0621 |
| 2018/0154907 | A1* | 6/2018 | Hecht | G01C 21/3626 |
| 2018/0195866 | A1* | 7/2018 | Uno | G01C 21/3407 |

OTHER PUBLICATIONS

'descartes.com' [online] "Descartes Area Planner™—Delivery Route Planner Software," Retrieved on Nov. 20, 2017, Retrieved from URL <https://www.descartes.com/documents/descartes-area-planner, 4 pages.

'desktop.arcgis.com' [online] "Vehicle routing problem analysis" Retrieved on Nov. 20, 2017, Retrieved from URL <http://desktop.arcgis.com/en/arcmap/latest/extensions/network-analyst/vehicle-routing-problem.htm, 52 pages.

'en.wikipedia.org' [online] "Vehicle routing problem," Retrieved on Jan. 18. 2018, Retrieved from URL <https://en.wikipedia.org/wiki/Vehicle_routing_problem, 5 pages.

'jungleworks.co' [online] "Acknowledge a Task—Accept/Decline," Retrieved on Nov. 20, 2017, Retrieved from URL <https://jungleworks.co/tookan/supportv1/acknowledge-task-acceptdecline/, 2 pages.

'jungleworks.co' [online] "Auto Assignment," Retrieved on Nov. 20, 2017, Retrieved from URL <https://jungleworks.co/tookan/supportv1/auto-assignment/, 4 pages.

'jungleworks.co' [online] "Route optimization," Retrieved on Nov. 20, 2017, Retrieved from URL <https://jungleworks.co/tookan/supportv1/route-optimization/, 2 pages.

'llamasoft.com' [online] "Transportation Route Planning Software," Retrieved on Nov. 20, 2017, Retrieved from URL <https://www.llamasoft.com/transportation-route-planning-software/, 4 pages.

'opendoorlogistics' [online] "Modelling on-demand delivery networks," Posted on Jun. 6, 2016, Retrieved on Nov. 20, 2017, Retrieved from URL <http://www.opendoorlogistics.com/modelling-on-demand-delivery-networks/, 2 pages.

'oracle.com' [online] "Using mobility cloud service: working with unrouted activities," Retrieved on Nov. 20, 2017, Retrieved from URL <https://docs.oracle.com/cloud/latest/fieldservicecs_gs/FAMCU/Mobility-8.htm#FAMCUth_Workingwithunroutedactivities, 3 pages.

'paragontruckrouting.com' [online] "Paragon Helps Retailers Prepare for Seasonal Deliveries," Nov. 4, 2014, Retrieved on Nov. 20, 2017, Retrieved from URL <https://www.paragontruckrouting.com/about/news/paragon-helps-retailers-prepare-seasonal-deliveries, 4 pages.

'route4me.com' [online] "Batch Route Optimization," Retrieved on Nov. 20, 2017, Retrieved from URL <https://www.route4me.com/platform/data/batch-routing, 1 page.

'tmwsystems.com' [online] "Routing & Dispatch," Retrieved on Nov. 20, 2017, Retrieved from URL <https://www.tmwsystems.com/, 5 pages.

'toursolver.com' [online] "Coming soon in toursolver cloud" Retrieved on Nov. 20, 2017, Retrieved from URL <http://www.toursolver.com/en/Functionalities, 1 page.

'toursolver.com' [online] "Functionalities," Retrieved on Nov. 20, 2017, Retrieved from URL <http://www.toursolver.com/en/Functionalities, 9 pages.

'workwave.com' [online] "Your Shortcut to Faster (and More Powerful) Routes," Retrieved on Nov. 20, 2017, Retrieved from URL <https://www.workwave.com/route-manager/route-planning, 7 pages.

"Grand Junction—Last Mile Platform Help Site," 256 pages.

Munoz-Villamizar et al., "Mathematical Programming Modeling and Resolution of the Location-Routing Problem in Urban Logistics1," *Ingeniería y Universidad.*, 18(2):271-289, 2014.

* cited by examiner

DELIVERY ROUTE MANAGEMENT AND OPTIMIZATION

BACKGROUND

The present disclosure relates to delivery route management and optimization.

Routing software may be used to help shippers plan delivery routes for drivers that have been assigned delivery of various items. When a route includes multiple stops, for example, the routing software can determine an order for the stops based on criteria such as driving time and distance. The routing software can then generate a map that includes each of the stops, and can provide directions for navigating the route.

SUMMARY

This document generally describes computer systems, processes, program products, and devices for managing and optimizing delivery routes.

In some implementations, a method performed by data processing apparatuses includes identifying a first delivery route that includes delivery stops at multiple locations within a first geographic region, and identifying a second delivery route that includes delivery stops at multiple locations within a second geographic region. The first delivery route can be assigned to a first carrier that is designated to deliver orders within the first geographic region, and the second delivery route can be assigned to a second carrier that is designated to deliver orders within the second geographic region. An additional order can then be identified that is requested to be delivered to a location within the first geographic region while the first carrier is performing the first delivery route and the second carrier is performing the second delivery route. The data processing apparatuses can determine that a cost of modifying the second delivery route to include an additional delivery stop for the additional order is less than a cost of modifying the first delivery route to include the additional delivery stop for the additional order, and in response, the second delivery route can be modified to include the additional delivery stop for the additional order, including assigning the additional order to the second carrier even though the second carrier is designated to deliver orders within the second geographic region rather than the first geographic region.

In some implementations, a method performed by data processing apparatuses includes receiving, by a first computing system corresponding to a first entity, data representing multiple delivery routes, where each delivery route includes a sequence of scheduled delivery stops at locations within a geographic region, and each delivery stop corresponds to one or more orders that have been scheduled for delivery. The multiple delivery routes can be classified (e.g., grouped) into multiple groups of delivery routes based on one or more criteria, wherein at least one of the multiple groups of delivery routes includes two or more delivery routes from among the multiple delivery routes. Each group of delivery routes can be assigned to a respective carrier entity, and at least two groups from among the multiple groups of delivery routes can be assigned to different carrier entities. The first computing system can transmit respective portions of the data representing the multiple delivery routes to corresponding second computing systems of the carrier entities assigned to the group of delivery routes. A first carrier entity that has been assigned a first group of delivery routes can dispatch individual delivery routes in the first group of delivery routes to individual drivers to execute the individual delivery routes.

Particular embodiments of the subject matter described in this specification may be implemented so as to realize one or more of the following advantages. Routes can be generated before assigning the routes to different carriers. The routes can potentially cross geography boundaries of the different carriers, thus producing more efficient routes than if the routes were generated after assigning the routes to the carriers. Efficiencies can be discovered that would not be apparent if orders were assigned based solely on a primary geographic region of a carrier.

The details of one or more embodiments of the subject matter described in this specification are set forth in the accompanying drawings and the description below. Other features, aspects, and potential advantages of the subject matter will become apparent from the description, the drawings, and the claims.

DESCRIPTION OF DRAWINGS

Like reference symbols in the various drawings indicate like elements.

DETAILED DESCRIPTION

This specification describes techniques for generating optimized routes by which a network of carriers can deliver orders to individual customer locations. In particular, a retailer, or other entity, can receive a set of orders for goods that are to be delivered or picked up at various locations within a geographic region (e.g., a city or metropolitan area). Each order is associated with a set of parameters and delivery constraints. The parameters of an order indicate pertinent information such as pickup location, delivery location, and order size. The delivery constraints for an order define constraints for successful fulfillment of the order such as acceptable delivery timeframes, target delivery date, and special handling instructions.

A set of orders that have been entered into the retailer's order management system can be selected and provided to a routing engine that generates one or more delivery routes that optimize one or more delivery criteria, such as total distance traveled, total delivery costs, total delivery times, or a combination of these. A delivery route identifies a sequence of stops for a driver to make to fulfill a subset of orders that have been assigned to the route (or to fulfill all orders if multiple routes are not necessary), and optionally can indicate target arrival and departure times from each stop, and a path/turn-by-turn directions to navigate between each stop. The routing engine attempts to satisfy as many delivery constraints associated with the orders as possible, while complying with a set of routing constraints that limit the capacity for delivering orders. The routing constraints can include, for example, a number of available drivers, available shift times for the drivers, maximum number of orders per driver, and acceptable geographic zones for each driver.

For example, a user may select in a graphical interface a set of n orders to be delivered to customers' residences on a particular day. The set of orders can be provided to a computer-based routing engine, along with a set of routing constraints manually set by a user or automatically set by default or according to an algorithm. The routing constraints may specify that m drivers are available during the particular day to deliver the orders. If the number of drivers m provides sufficient capacity, the routing engine will return two routes to allow all orders to be delivered between the m drivers. Each route is then dispatched to a different driver. If the number of drivers m is insufficient and the drivers cannot physically complete the deliveries within their shifts while satisfying the delivery constraints for the orders, the system may return an error and prompt a user to relax delivery constraints for one or more orders and/or may alert a user that additional capacity is required so the orders can be divided among additional routes. Appropriate remedial action may be taken, such as removing orders from the list, selecting a different delivery mode for particular orders, relaxing delivery constraints associated with the orders, adding additional drivers, or offering something of value to customers who are willing to relax the delivery constraints for their orders.

In some cases, the retailer or shipping entity maintains partnerships with multiple carrier organizations. Each carrier organization may independently operate a fleet of vehicles and hire drivers outside the control of the principal retailer or shipping entity. Rather than dispatching routes to individual drivers, the retailer or shipping entity clusters or groups routes and assign groups of routes to different carrier organizations, which in turn manage dispatch of routes to individual drivers under their control. Some carrier organizations may reserve capacity for deliveries for a particular retailer or shipping entity, so as to ensure that the carrier has sufficient capacity for an assigned route or group of routes. Some carriers may share their capacity among multiple retailers or shipping entities, and may not reserve capacity for routes that have not yet been assigned.

Figure 1:
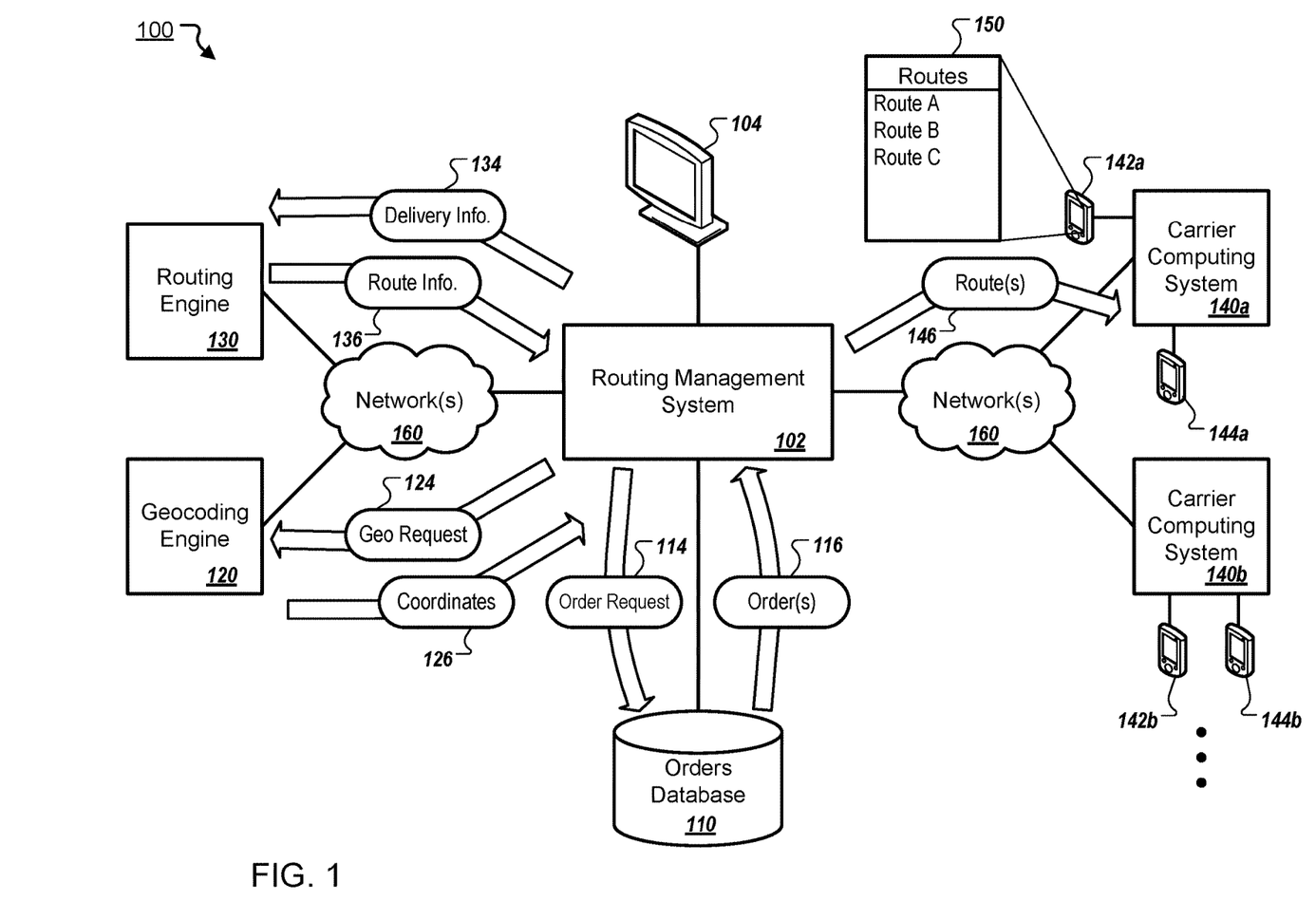
FIG. 1 is a conceptual diagram of an example system for generating and managing delivery routes.

FIG. 1 is a conceptual diagram of an example system 100 for generating and managing delivery routes. The example system 100 includes a routing management system 102 (e.g., including various peripheral devices 104 for receiving input from system users and providing output to system users) that can provide an order request 114 for one or more orders 116 to be selected from an orders database 110. In the present example, the routing management system 102 can submit a geographic coordinate request 124 for addresses specified in the orders 116 to a geocoding engine 120, and can receive geographic coordinates 126 for the addresses in return. After receiving the geographic coordinates 126, for example, the routing management system 102 can provide delivery information 134 for the orders 116 to a routing engine 130. The delivery information 134 can include corresponding geographic coordinates 126 for each of the orders 116, can include additional order metadata that defines order and delivery constraints, and can include various routing constraints. In response to receiving the delivery information 134, for example, the routing engine 130 can provide to the routing management system 102 route information 136 that includes one or more routes for fulfilling the orders 116. The routing management system 102 can then use the route information 136 to distribute various routes 146 among multiple carrier computing systems (e.g., carrier computing systems 140a and 140b). Each of the carrier computing systems 140a-b, for example, can be in communication with one or more driver devices (e.g., carrier computing system 140a being in communication with driver devices 142a and 144a, and carrier computing system 140b being in communication with driver devices 142b and 144b). The carrier computing systems 140a-b, for example, can each dispatch one or more routes to a respective driver device for use by its driver. The driver device 142a, for example, can provide an interface 150 which allows the driver to select a desired route from a queue of active available routes. As another example, the carrier computing system 140a can assign a route for the driver, and can send route information that pertains to the assigned route to the driver device 142a.

The routing management system 102, the geocoding engine 120, the routing engine 130, and each of the carrier computing systems 140, for example, can each include one or more computer servers and one or more databases. For example, the routing management system 102 can be or include various types of servers including, but not limited to, an application server, a web server, a proxy server, or a server farm. In some implementations, two or more of the systems 102, 140, and/or engines 120, 130 may be combined. For example, the geocoding engine 120 may be combined with the routing engine 130 and/or one or more of the engines may be included in the routing management system 102.

In the present example, the routing management system 102 can be in communication with the geocoding engine 120, the routing engine 130, and each of the carrier computing systems 140 over one or more network(s) 160. Examples of the network(s) 160 include a local area network (LAN), a wide area network (WAN), and the Internet. Each of the carrier computing systems 140 can also communicate with its respective driver devices (e.g., the carrier computing system 140a can communicate with driver devices 142a and 144a, and the carrier computing system 140b can communicate with driver devices 142b and 144b) using the network(s) 160, or using different networks. The driver devices 142a, 144a, 142b, 144b, for example, can represent various forms of processing devices including, but not limited to, a laptop computer, a tablet computer, a handheld computer, a personal digital assistant (PDA), a smart phone, a smart watch, smart glasses, or a combination of any two or more of these data processing devices or other suitable data processing devices.

Operations performed within the example system 100 are described in further detail with respect to the flowcharts shown in FIGS. 2, 3, 4, and 6.

Figure 2:
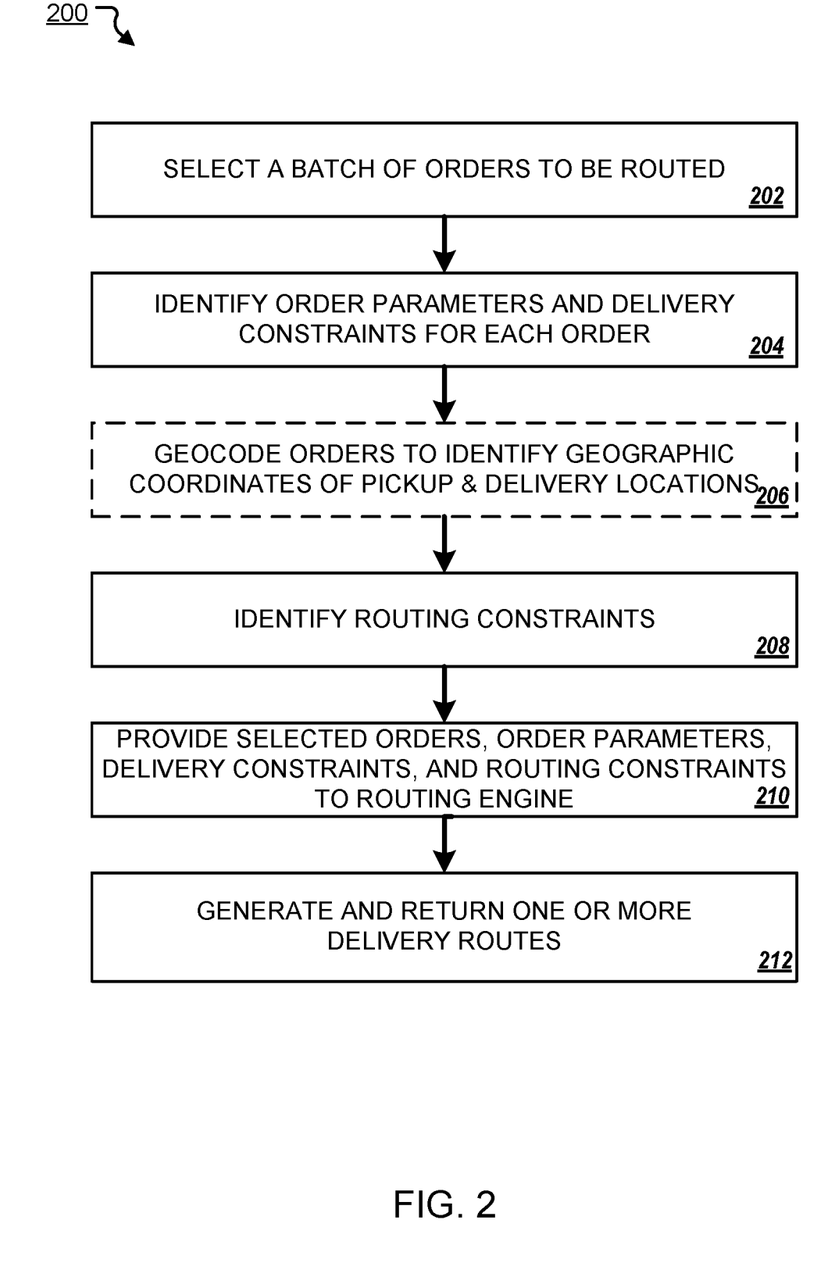
FIG. 2 is a flowchart of an example technique for generating delivery routes.

FIG. 2 is a flowchart of an example technique 200 for generating delivery routes. The example technique 200 can be performed by any of a variety of appropriate systems, such as the system 100 (shown in FIG. 1).

A batch of orders to be routed is selected (202). Referring to FIG. 1, for example, the routing management system 102 can generate order request 114 (e.g., a database query), can submit the order request 114 to the orders database 110 (e.g., a relational database, a file system, or another suitable type of database), and can receive orders 116 that correspond to the order request 114 from the orders database 110. Each of the orders 116, for example, can be for goods that are to be delivered or picked up at various locations within a geographic region.

Order parameters and delivery constraints can be identified for each order (204). The order parameters, for example, can include information for the order such as pickup location, delivery location, order size (e.g., quantities of items included in the order), and other pertinent information. The delivery constraints for an order, for example, can define constraints for successful fulfillment of the order such as a delivery time window for the order, a stop time for the order (e.g., an estimated amount of time to service the order), a priority level for the order (e.g., high, medium, low), special handling instructions, and other appropriate constraints.

Optionally, orders may be geocoded to identify geographic coordinates of pickup and delivery locations (206). For example, each of the orders 116 may be associated with order parameters that specify an address for a pickup location and an address for a delivery location, whereas the routing engine 130 may be configured to generate routes based on geographic coordinate data (e.g., latitude/longitude coordinates). In the present example, the routing management system 102 can submit the geographic coordinate request 124 to the geocoding engine 120, including the pickup location and delivery location addresses for each of the orders 116. The geocoding engine can then determine corresponding geographic coordinates 126 for each of the pickup locations and delivery locations for each of the orders, and can provide the geographic coordinates 126 to the routing management system 102.

Routing constraints can be identified (208). The routing constraints, for example, can include a number of available drivers, available shift times for the drivers, a maximum number of orders for each driver, acceptable geographic zones for each driver, capabilities associated with each driver (e.g., product transportation and/or installation capabilities) and other appropriate routing constraints.

Selected orders, order parameters, delivery constraints, and routing constraints can be provided to a routing engine (210). For example, the routing management system 102 can provide delivery information 134 to the routing engine 130. The delivery information 134, for example, can include parameters associated with the orders 116, corresponding geographic coordinates 126 for pickup location and delivery location addresses for the orders 116, delivery constraints associated with the orders 116, and routing constraints associated with one or more carriers that may be selected for performing delivery of the orders 116.

One or more delivery routes are generated and returned (212). For example, the routing management system 102 can receive route information 136 that includes one or more routes for fulfilling the orders 116, from the routing engine 130. Each route specified by the route information 136, for example, can identify a sequence of stops for a driver to make to fulfill a subset of orders that have been assigned to the route (or to fulfill all orders if multiple routes are not necessary). Optionally, each route can indicate target arrival and departure times from each stop, and a path/turn-by-turn directions to navigate between each stop. The routing engine 130, for example, can attempt to satisfy as many delivery constraints associated with the orders 116 as possible, while complying with the routing constraints that limit the capacity for delivering the orders 116.

Figure 3:
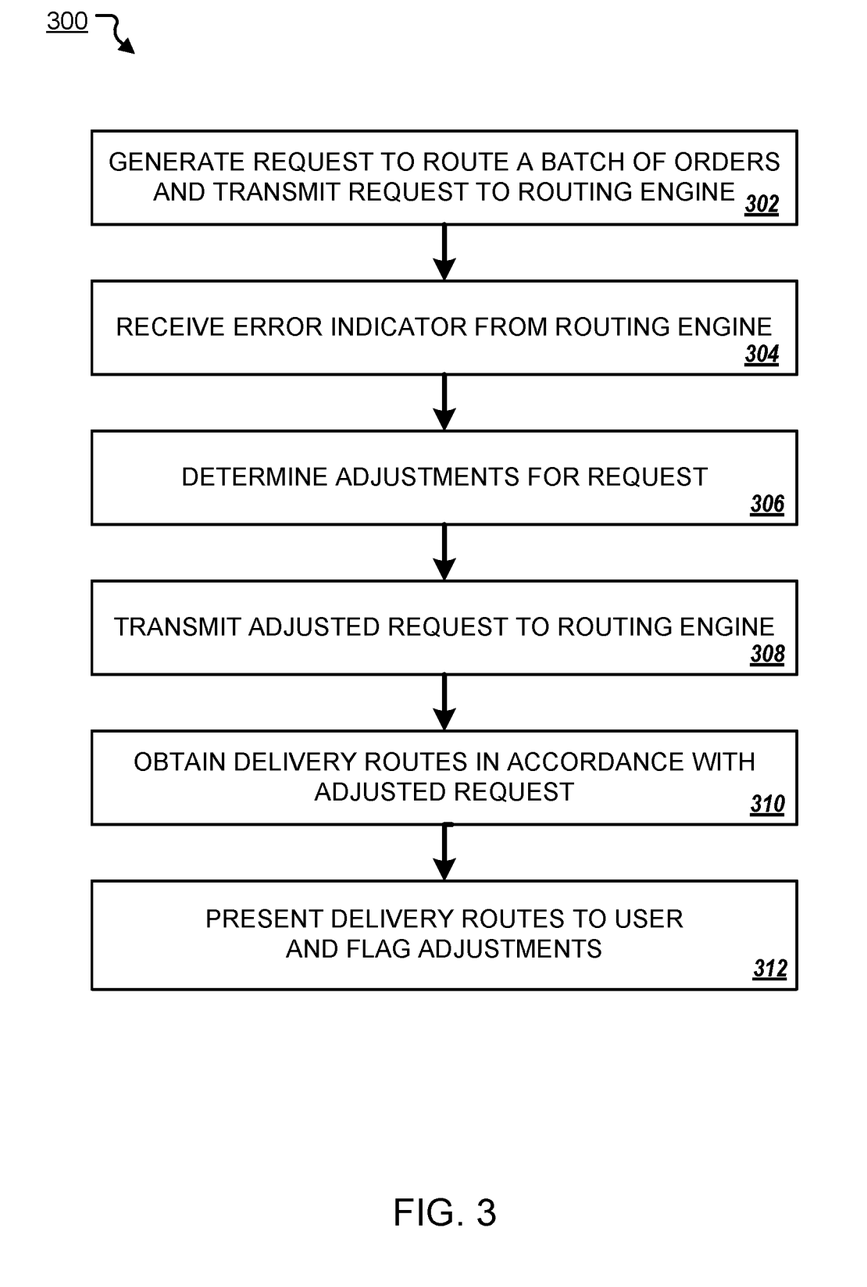
FIG. 3 is a flowchart of an example technique for obtaining delivery routes in accordance with an adjusted request.

FIG. 3 is a flowchart of an example technique 300 for obtaining delivery routes in accordance with an adjusted request. The example technique 300 can be performed by any of a variety of appropriate systems, such as the system 100 (shown in FIG. 1).

A request to route a batch of orders is generated, and the request is transmitted to a routing engine (302). Referring to FIG. 1, for example, the routing management system 102 can generate and provide a request to the routing engine 130, the request including delivery information 134 for the orders 116. For example, the routing management system 102 can request that the routing engine 130 provide one or more routes for the orders 116 that are to be delivered to customers' residences on a particular day. The orders 116 can be provided to the routing engine 130, for example, along with routing constraints manually set by a system user or automatically set by default or according to an algorithm. The routing constraints, for example, may specify that a particular number of drivers are available during the particular day to deliver the orders 116.

An error indicator may be received from the routing engine (304). For example, the routing engine 130 can process delivery information 134 including the routing constraints, can determine whether the orders 116 are capable of being fulfilled, given the order parameters, delivery constraints, and routing constraints, and can provide an error indicator (e.g., a code) to the routing management system 102 when the orders 116 are incapable of being fulfilled. In the present example, the routing engine 130 may determine that the particular number of available drivers are insufficient for fulfilling the orders 116, such that the drivers are unable to complete the deliveries within their available shift times while satisfying the delivery constraints for the orders (e.g., the delivery time windows for the orders).

In some implementations, information associated with the error indicator may be presented to a system user as an alert. For example, the routing management system 102 can present an alert using the peripheral device 104 (e.g., a display) that prompts the system user to relax delivery constraints for one or more of the orders 116 and/or prompts the system user that additional capacity is needed (e.g., additional drivers and/or increased driver shift times) in order to fulfill the orders.

One or more adjustments can be determined for the request (306). In response to the error indicator, for example, the routing management system 102 can adjust the request to route the orders 116, including adjusting one or more of the order constraints, and/or routing constraints. Adjusting the order constraints, for example, can include removing one or more orders from the request (e.g., orders that are associated with a low priority level), modifying a delivery time window for one or more orders (e.g., increasing and/or shifting the time window), and other suitable adjustments that would lead to fulfillment of the orders. Adjusting the routing constraints, for example, can include increasing a number of available drivers, increasing driver shift times, and other suitable adjustments that would lead to fulfillment of the orders.

An adjusted request is transmitted to the routing engine (308). After adjusting the order constraints and/or the routing constraints for the orders 116, for example, the routing management system 102 can transmit the adjusted request for routes to the routing engine 130, the adjusted request including adjusted delivery information 134 for the orders 116. In the present example, the adjusted delivery information 134 can indicate that orders that are associated with a low priority level are removed from the request, and driver shift times are increased.

Delivery routes are obtained in accordance with the adjusted request (310). For example, the routing management system 102 can receive route information 136 from the routing engine 130, given the adjusted order constraints and/or adjusted routing constraints. In the present example, adjusting the constraints has resulted in the routing engine 130 determining one or more routes for fulfilling the orders 116, without an error.

Delivery routes may be presented to a user, and adjustments may be flagged (312). For example, the routing management system 102 can present route information 136 using the peripheral device 104 (e.g., a display device), and can flag adjustments to the order constraints and/or the routing constraints. In the present example, the routing management system 102 can flag that orders that are associated with a low priority level are not included in any generated routes, and that driver shift times have been increased.

Figure 4:
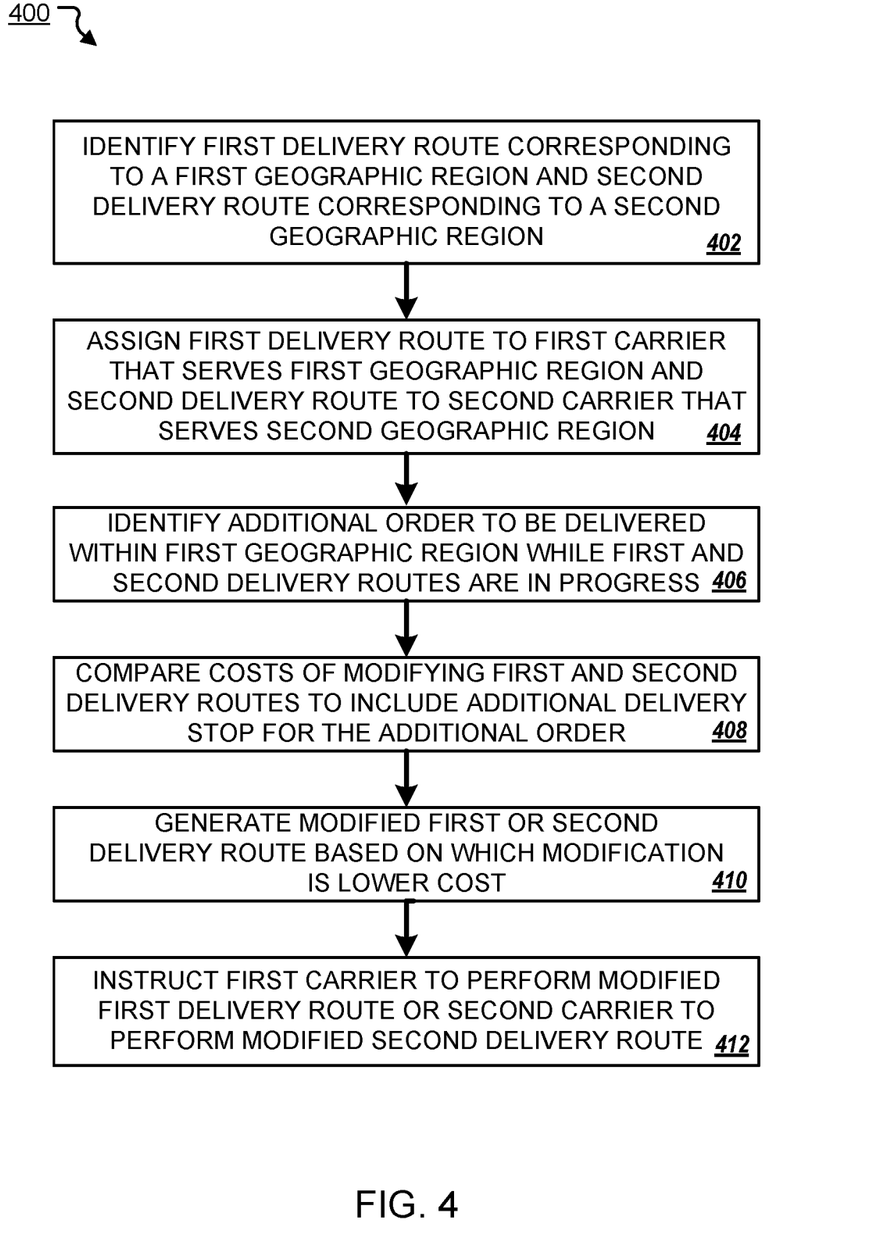
FIG. 4 is a flowchart of an example technique for generating modified delivery routes.

FIG. 4 is a flowchart of an example technique 400 for generating modified delivery routes. The example technique 400 can be performed by any of a variety of appropriate systems, such as the system 100 (shown in FIG. 1).

In general, routes may be initially generated by selecting a group of orders, identifying delivery constraints (e.g., order and/or routing constraints) for each order in the group of orders, providing data representing the group of orders and the delivery constraints to a routing engine, and obtaining delivery routes from the routing engine. For example, a first delivery route and a second delivery route can each be obtained from the routing engine 130, the first and second delivery routes each being generated by the routing engine 130 using the data representing the group of orders 116 and the delivery constraints for the respective routes (e.g., the delivery information 134). Routes may be initially generated, for example, using the technique 200 for generating delivery routes described above with respect to FIG. 2 and/or using the technique 300 for obtaining delivery routes in accordance with an adjusted request described above with respect to FIG. 3.

Figure 5:
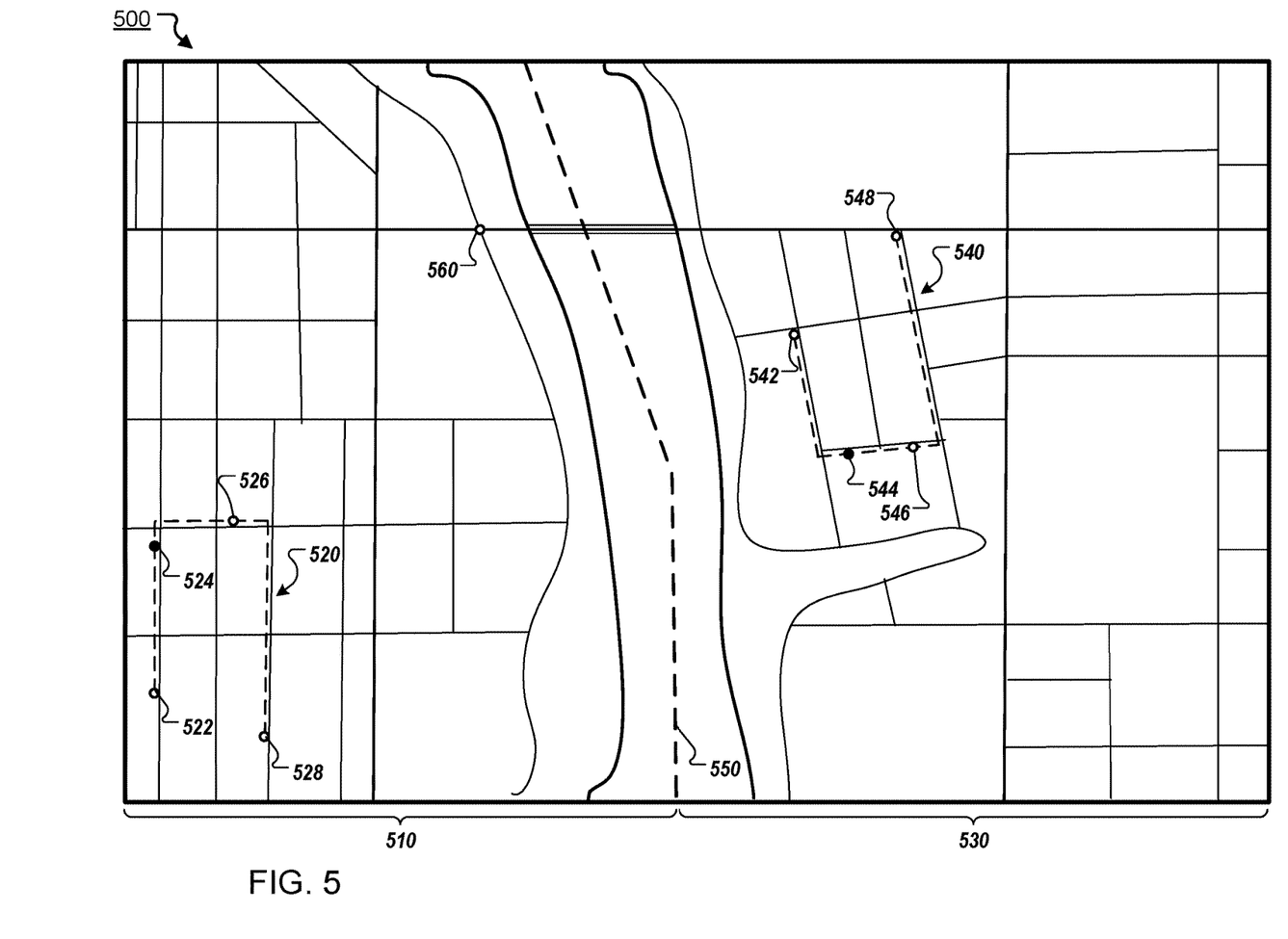
FIG. 5 shows an example mapping of delivery route information.

A first delivery route corresponding to a first geographic region and a second delivery route corresponding to a second geographic region are identified (402). Referring now to FIG. 5, for example, an example mapping 500 of delivery route information is shown. As shown in FIG. 5, for example, a first delivery route 520 can include an initial pickup location 522 and delivery stops at multiple locations 526 and 528 within a first geographic region 510. A second delivery route 540, for example, can include an initial pickup location 542 and delivery stops at multiple locations 546 and 548 within a second geographic region 530. The first geographic region 510 and the second geographic region 530, for example, can be adjacent to each other and can be separated by a border (e.g., a natural or artificial separator of regions). In the present example, the first geographic region 510 and the second geographic region 530 are separated by border 550 (e.g., a river).

The first delivery route can be assigned to a first carrier that serves the first geographic region, and the second delivery route can be assigned to a second carrier that serves the second geographic region (404). Referring to FIG. 1, for example, the first carrier (e.g., a carrier that employs the carrier computing system 140*a*) can be designated by the routing management system 102 to deliver orders within the first geographic region 510, and the second carrier (e.g., a carrier that employs the carrier computing system 140*b*) can be designated by the routing management system 102 to deliver orders within the second geographic region 530.

An additional order to be delivered within the first geographic region can be identified while the first and second delivery routes are in progress (406). Referring again to FIG. 5, for example, while the first carrier is performing the first delivery route 520 (e.g., as indicated by a current location 524 of a driver for the first carrier) and the second carrier is performing the second delivery route 540 (e.g., as indicated by a current location 544 of a driver for the second carrier), the additional order can be requested to be delivered within the first geographic region 510. Current locations of carrier drivers, for example, can be determined by Global Positioning System (GPS) devices carried by drivers and/or vehicles. In the present example, the additional order can be received by the routing management system 102, and can specify that goods are to be delivered to location 560 in the first geographic region 510.

Costs of modifying the first and second delivery routes to include an additional delivery stop for the additional order are compared (408). For example, the routing management system 102 can determine that a cost of modifying the second delivery route 540 to include the additional delivery stop for the additional order (e.g., a stop at the location 560) is less than a cost of modifying the first delivery route 520 to include the additional delivery stop for the additional order.

In some implementations, the cost of modifying the first delivery route may be determined by simulating a modified version of the first delivery route that incorporates the additional delivery stop for the additional order, and the cost of modifying the second delivery route may be determined by simulating a modified version of the second delivery route that incorporates the additional delivery stop for the additional order. For example, the routing management system 102 can provide a first request to the routing engine 130 for a first modified route that adds the additional delivery stop at the location 560 to the first delivery route 520, and can provide a second request to the routing engine 130 for a second modified route that adds the additional delivery stop at the location 560 to the second delivery route 540. The routing management system 102 can then perform a simulation for each of the modified routes, and based on the simulations, determine a cost of modifying each respective route. Moreover, while only two routes 520 and 540 have been discussed in this particular example, it should be understood that the routing management system 102 may simulate delivery route modifications and predict costs of the modifications for any number of routes that have previously been generated and/or that are currently being performed and are partially completed. In some instances, the routing management system 102 may simulate delivery route modifications and predict costs for all existing routes.

In some implementations, determining the cost of modifying the first delivery route may include comparing at least one characteristic of the first delivery route to at least one characteristic of the modified version of the first delivery route, and determining the cost of modifying the second delivery route may include comparing at least one characteristic of the second delivery route to at least one characteristic of the modified version of the second delivery route. For example, the routing management system 102 can compare travel distances and travel times for the first delivery route 520 and the modified version of the route 520 to determine a cost of modifying the route 520. Similarly, the routing management system 102, for example, can compare travel distances and travel times for the second delivery route 540 and the modified version of the route 540 to determine a cost of modifying the route 540. Travel times and distances may change, for example, as a result of picking up an additional order for delivery and then completing the delivery during a stop at the destination for the order. The system 102 may also determine a cost of modifying a route based on metrics indicating the impact on delivery constraints for existing orders and the ability to meet delivery constraints for an order that is proposed to be added to a route. For instance, the system 102 may impose a penalty cost if adding an order to a route causes delay in delivery of existing orders on the route, or if the new order cannot be delivered according to its specified constraints (e.g. within a promised delivery window).

In some implementations, determining that the cost of modifying the second delivery route to include the additional delivery stop for the additional order is less than the cost of modifying the first delivery route to include the additional delivery stop for the additional order may include comparing at least one characteristic of the modified version of the first delivery route to at least one characteristic of the modified version of the second delivery route. For example, the routing management system 102 can compare travel distances and travel times for the modified version of the first delivery route 520 and travel distances and travel times for the modified version of the second delivery route 540.

In some implementations, determining the cost of modifying the second delivery route may include identifying that a pickup location for the additional order or the delivery location for the additional order is outside the second geographic region for which the second carrier is designated, and applying a penalty to the cost of modifying the second delivery route. In the present example, the routing management system 102 can determine that the location 560 of the additional delivery stop is outside of the second geographic region 530, whereas the pickup location 542 is within the second geographic location. Applying the penalty, for example, can be a result of the pickup location 542 for the additional order and/or the delivery location 560 for the additional order being outside the second geographic region 530 for which the second carrier is designated. As another example, applying the penalty can be a result of the second delivery route 540 being assigned to the second carrier. The penalty, for example, can be an absolute or percentage cost penalty.

In some implementations, determining the cost of modifying the first delivery route may include identifying that a pickup location for the additional order or the delivery location for the additional order is within the first geographic region for which the first carrier is designated, and applying a reduction to the cost of modifying the first delivery route. In the present example, the routing management system 102 can determine that the location 560 of the additional delivery stop is within the geographic region 510, as is the pickup location 522. Applying the reduction, for example, can be a result of the pickup location 522 for the additional order and/or the delivery location 560 for the additional order being within the first geographic region 510 for which the first carrier is designated. As another example, applying the reduction can be a result of the first delivery route 520 being assigned to the first carrier. The reduction, for example, can be an absolute or percentage reduction.

In some implementations, the cost of modifying a delivery route can be based at least on an increase in distance of the delivery route that results from including the additional delivery stop, an increase in travel time for the delivery route that results from including the additional delivery stop, or an expected increase in charges from the carrier that results from including the additional delivery stop. For example, the cost of modifying the first delivery route 520 can be based on an increase in distance of the first delivery route 520 and an increase in travel time that results from including an additional delivery stop at the location 560, and an expected increase in charges from the first carrier (e.g., charges resulting from driver overtime or other circumstances).

In some implementations, the cost of modifying a delivery route can be based at least in part on a distance between a point along a delivery route and a pickup location or delivery location for the additional order. For example, the cost of modifying the first delivery route 520 can be based on a distance between the current location 524 of the driver for the first carrier, the pickup location 522, and the location 560 of the additional stop. In order to fulfill the additional order, for example, the driver for the first carrier may need to return to the pickup location 522.

In some implementations, the cost of modifying a delivery route can be based at least in part on a carrier's ability to meet delivery constraints associated with other orders on the first delivery route. For example, the cost of modifying the first delivery route 520 can be based on the first carrier's ability to meet delivery constraints associated with delivery of orders at each of the stops at locations 526 and 528, in addition to the additional stop at location 560. Failure to meet delivery constraints, for example, may result in additional costs and/or penalties for fulfilling the delivery route 520.

A modified first or second delivery route is generated, based on which modification is associated with a lower cost (410). In the present example, in response to determining that the cost of modifying the second delivery route 540 to include the additional delivery stop at location 560 for the additional order is less than the cost of modifying the first delivery route 520 to include the additional delivery stop at location 560 for the additional order, the routing management system 102 can modify the second delivery route 540 to include the additional delivery stop for the additional order. Modifying the second delivery route 540, for example, can include assigning the additional order to the second carrier even though the second carrier is designated to deliver orders within the second geographic region 530 rather than the first geographic region 510.

Either the first carrier may be instructed to perform a modified first delivery route, or the second carrier may be instructed to perform a modified second delivery route (412). In the present example, the routing management system 102 provides the modified second delivery route to the second carrier (e.g., the carrier that employs the carrier computing system 140*b*).

Figure 6:
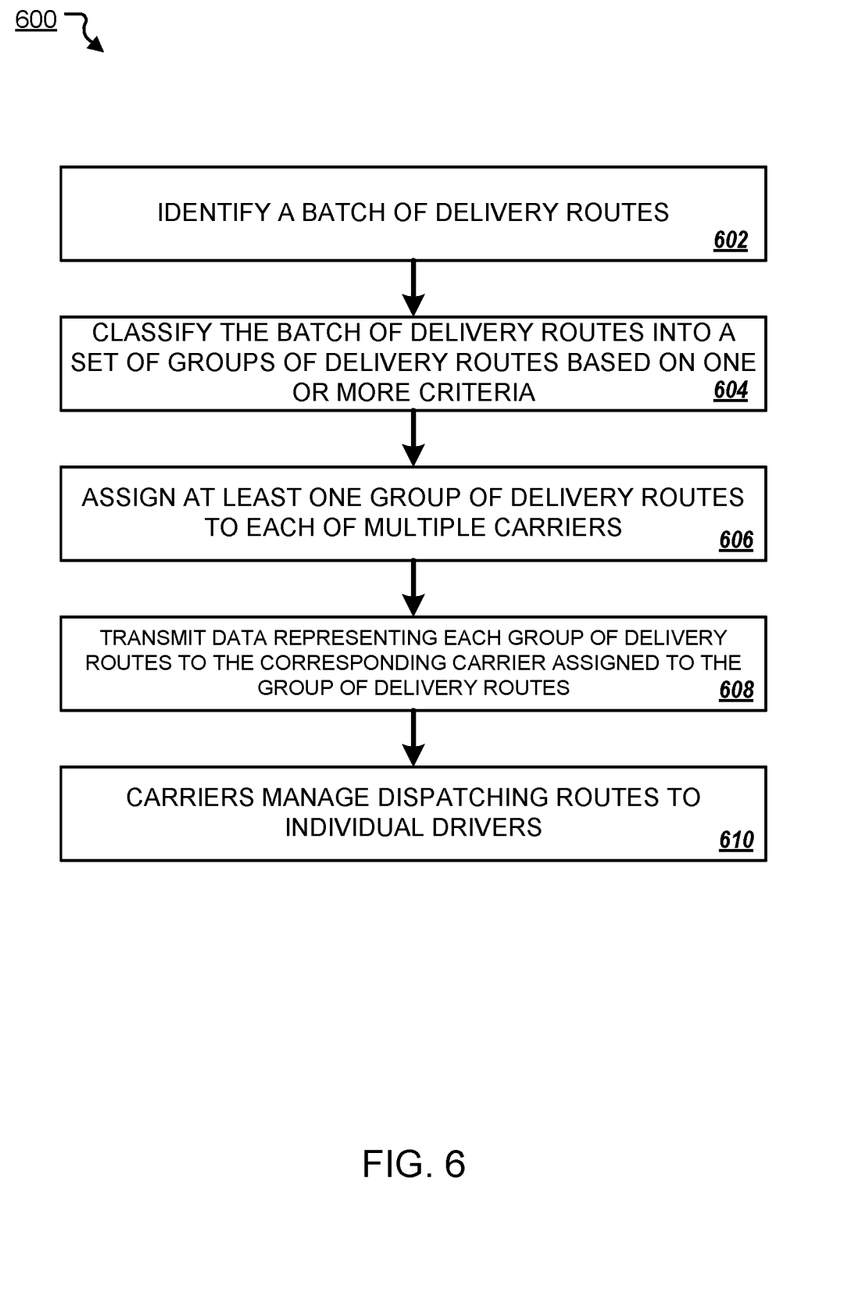
FIG. 6 is a flowchart of an example technique for transmitting and managing delivery route information.

FIG. 6 is a flowchart of an example technique 600 for transmitting and managing delivery route information. The example technique 600 can be performed by any of a variety of appropriate systems, such as the system 100 (shown in FIG. 1).

A batch of delivery routes is identified (602). A first computing system corresponding to a first entity, for example, can receive data representing a plurality of delivery routes, each delivery route comprising a sequence of scheduled delivery stops at locations within a geographic region, each delivery stop corresponding to one or more orders that are scheduled for delivery. In the present example, the routing management system 102 can receive route information 136 from the routing engine 130 corresponding to the orders 116.

In some implementations, receiving the data representing the plurality of delivery routes may include selecting a group of orders, identifying delivery constraints for each order in the group of orders, providing data representing the group of orders and the delivery constraints to a routing engine, and obtaining the data representing the plurality of delivery route from the routing engine. For example, the routing engine 130 can generate a plurality of delivery routes based on the delivery data 134 representing the group of orders 116 and the associated delivery constraints. Routes may be generated, for example, using the technique 200 for generating delivery routes described above with respect to FIG. 2 and/or using the technique 300 for obtaining delivery routes in accordance with an adjusted request described above with respect to FIG. 3, and/or may be modified using the technique 400 described above with respect to FIG. 4.

The batch of delivery routes can be classified into a set of groups of delivery routes based on one or more criteria (604). For example, the routing management system 102 can classify the plurality of delivery routes into a plurality of groups of delivery routes. At least one of the plurality of groups of delivery routes may include multiple delivery routes from the plurality of delivery routes, for example.

In some implementations, classifying the plurality of delivery routes into the plurality of groups of delivery routes may include grouping delivery routes based on distances between locations of at least some of the scheduled delivery stops in the delivery routes. For example, the routing management system 102 can form groups that minimize the distances between locations of at least some of the scheduled delivery stops among the delivery routes in each group. As another example, the routing management system 102 can form groups that maximize the distances between locations of at least some of the scheduled delivery stops among the delivery routes in each group.

At least one group of delivery routes can be assigned to each of multiple carriers (606). For example, each group of delivery routes can be assigned to a respective carrier entity, at least two groups from the plurality of groups of delivery routes being assigned to different carrier entities. In the present example, the route management system 102 can assign a first group of delivery routes to a first carrier entity that employs carrier computing system 140a, and can assign a second group of delivery routes to a second carrier entity that employs carrier computing system 140b.

In some implementations, delivery routes may be selected for inclusion in a group of delivery routes that is assigned to a carrier entity based on at least one of a capacity of the carrier entity, a geographic region that the carrier entity is designated to service, or a cost of the carrier entity's delivery services. For example, the route management system 102 can select delivery routes for inclusion in the first group of delivery routes based on the first carrier entity having capacity to service the routes (e.g., based on a number of drivers employed by the carrier entity and/or driver shift times). As another example, the route management system 102 can select delivery routes for inclusion in the first group of delivery routes based on the first carrier entity servicing a geographic region that includes pickup locations and/or delivery stops along the delivery routes. As another example, the route management system 102 can select delivery routes for inclusion in the first group of delivery routes based on the first carrier entity having lower delivery costs relative to other carrier entities.

In some implementations, delivery routes may be selected for inclusion in a group of delivery routes that is assigned to a carrier entity based on distances between one or more pickup and/or delivery locations in the selected delivery routes and a location associated with the carrier entity. For example, each carrier entity may be associated with one or more carrier entity locations, including current locations of vehicles of the carrier entity and/or dispatching stations of the carrier entities. If a carrier entity location of the first carrier entity is within a predetermined distance of one or more pickup and/or delivery locations in the selected delivery routes, for example, the route management system 102 may select the delivery routes for inclusion in the first group of delivery routes.

Data representing each group of delivery routes is transmitted to the corresponding carrier assigned to the group of delivery routes (608). Respective portions of the data representing the plurality of delivery routes can be transmitted from the first computing system, for example, to corresponding second computing systems of the carrier entities assigned to the group of delivery routes. In the present example, the routing management system 102 can transmit portions of the data representing the first group of delivery routes to the carrier computing system 140a of the first carrier entity, and can transmit portions of the data representing the second group of delivery routes to the carrier computing system 140b of the second carrier entity.

The carriers can manage dispatching routes to individual drivers (610). For example, the carrier computing system 140a can manage dispatching of routes through the driver devices 142a and 144a, and the carrier computing system 140b can manage dispatching of routes through the driver devices 142b and 144b.

In some implementations, a carrier entity that has been assigned a group of delivery routes can dispatch individual delivery routes in the group of delivery routes to individual drivers to execute the individual delivery routes. For example, the individual drivers that use the respective driver devices 142a and 144a can be employees or contractors for the carrier entity that employs the carrier computing system 140a, and can be independent of an entity that employs the routing management system 102.

In some implementations, a carrier entity that has been assigned a group of delivery routes can provide representations of delivery routes from the group for display in a graphical user interface to permit drivers associated with the carrier entity to self-select delivery routes to assign themselves. For example, the carrier computing system 140a can provide data associated with each of the routes included in the first group of delivery routes to each of the driver devices 142a and 144a. In the present example, route information is shown for display by the interface 150 presented by the driver device 142a (e.g., Routes A, B, and C). A user of the driver device 142a can select one or more of the presented routes, for example. In response to the user selection, an indication of the selection can be provided to the carrier computing system 140a, and route information corresponding to the selected route can be removed from other devices associated with the carrier computing system 140a (e.g., the driver device 144a).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 7:
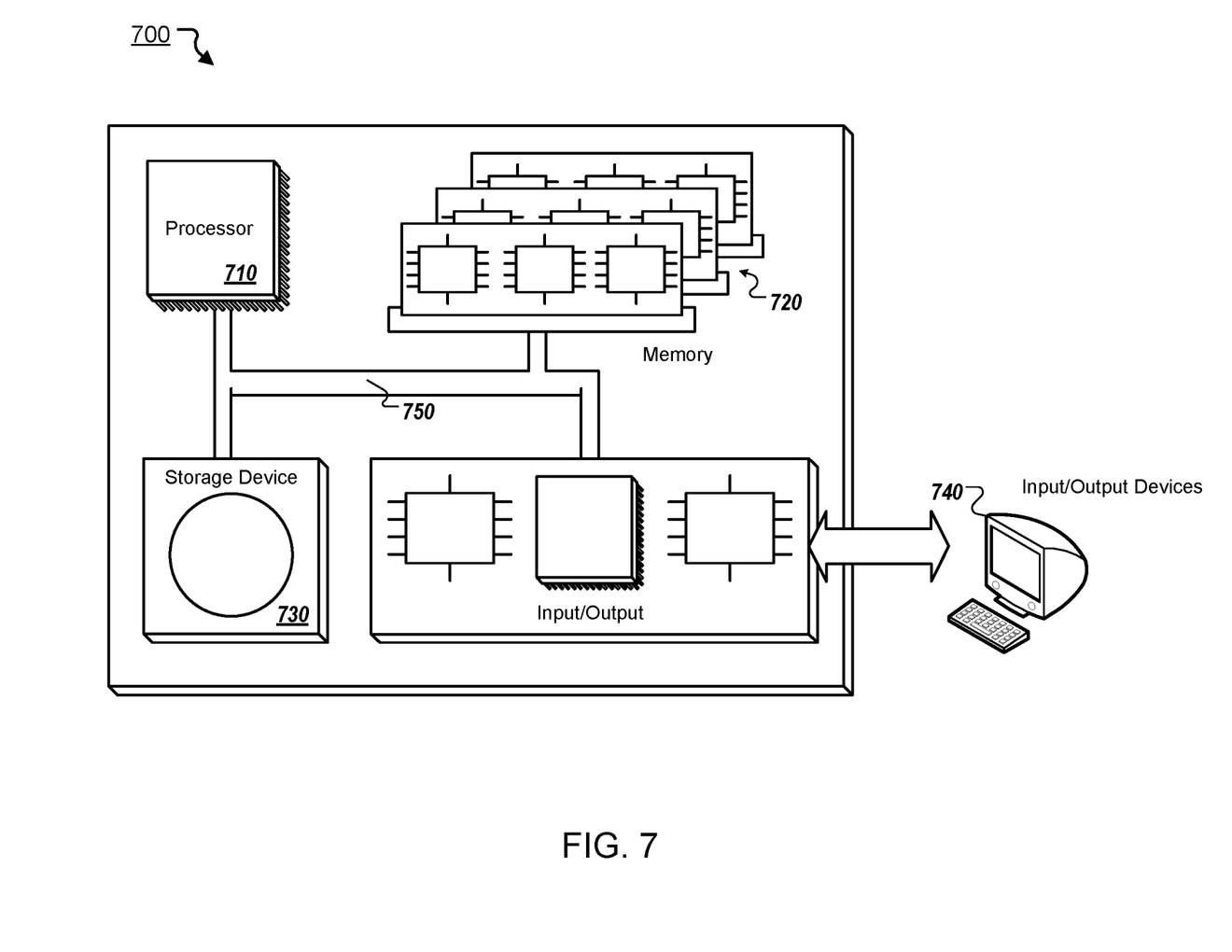
FIG. 7 is a schematic diagram of a computing system that can be used in connection with computer-implemented methods described in this document.

An example of one such type of computer is shown in FIG. 7, which shows a schematic diagram of a computer system 700. The system 700 can be used for the operations described in association with any of the computer-implement methods described previously, according to some implementations. The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

As used throughout this document, the terms optimum, optimize, and variations thereof refer to improving performance of a system through the use of the techniques discussed herein, and does not imply that the performance obtained is necessarily the most optimum performance that is achievable.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for modifying in-progress delivery routes, the method comprising:
    identifying, by a routing management system, a first delivery route that includes delivery stops at multiple locations within a first geographic region;
    assigning the first delivery route to a first carrier that is designated to deliver orders within the first geographic region, and transmitting, by the routing management system, the first delivery route to a first carrier computing system of the first carrier for forwarding to a first driver device;
    identifying, by the routing management system, a second delivery route that includes delivery stops at multiple locations within a second geographic region;
    assigning the second delivery route to a second carrier that is designated to deliver orders within the second geographic region, and transmitting, by the routing management system, the second delivery route to a second carrier computing system of the second carrier for forwarding to a second driver device;
    while a first driver of the first carrier is performing the first delivery route and a second driver of the second carrier is performing the second delivery route:
        (i) receiving, by the routing management system, a request to deliver an additional order to an order location within the first geographic region;
        (ii) in response to receiving the request to deliver the additional order, determining, by the routing management system, a current location of the first driver of the first carrier relative to the order location, based on location data from a global positioning system (GPS) device of the first driver device;
        (iii) in response to receiving the request to deliver the additional order, determining, by the routing management system, a current location of the second driver of the second carrier relative to the order location, based on location data from a GPS device of the second driver device;
        (iv) determining, by the routing management system and based at least in part on the current location of the first carrier relative to the order location, and the current location of the second carrier relative to the order location, that a cost of modifying a remaining portion of the second delivery route to include an additional delivery stop for the additional order is less than a cost of modifying a remaining portion of the first delivery route to include the additional delivery stop for the additional order; and
    in response to determining that the cost of modifying the remaining portion of the second delivery route to include the additional delivery stop for the additional order is less than the cost of modifying the remaining portion of the first delivery route to include the additional delivery stop for the additional order, modifying, by the routing management system, the remaining portion of the second delivery route to include the additional delivery stop for the additional order, including:
        (i) assigning the additional order to the second carrier even though the second carrier is designated to deliver orders within the second geographic region rather than the first geographic region, and
        (ii) transmitting, by the routing management system, the modified remaining portion of the second delivery route to the second carrier computing system of the second carrier for forwarding to the second driver device.

2. The method of claim 1, further comprising:
    determining the cost of modifying the remaining portion of the first delivery route by simulating a modified version of the first delivery route that incorporates the additional delivery stop for the additional order; and
    determining the cost of modifying the remaining portion of the second delivery route by simulating a modified version of the second delivery route that incorporates the additional delivery stop for the additional order.

3. The method of claim 2, wherein:
  determining the cost of modifying the remaining portion of the first delivery route further comprises comparing at least one characteristic of the first delivery route to the at least one characteristic of the modified version of the first delivery route; and
  determining the cost of modifying the remaining portion of the second delivery route further comprises comparing at least one characteristic of the second delivery route to the at least one characteristic of the modified version of the second delivery route.

4. The method of claim 2, wherein determining that the cost of modifying the remaining portion of the second delivery route to include the additional delivery stop for the additional order is less than the cost of modifying the remaining portion of the first delivery route to include the additional delivery stop for the additional order comprises comparing at least one characteristic of the modified version of the first delivery route to the at least one characteristic of the modified version of the second delivery route.

5. The method of claim 1, wherein determining the cost of modifying the remaining portion of the second delivery route comprises:
  identifying that a pickup location for the additional order or the delivery location for the additional order is outside the second geographic region for which the second carrier is designated; and
  applying a penalty to the cost of modifying the remaining portion of the second delivery route as a result of (i) the pickup location for the additional order or the delivery location for the additional order being outside the second geographic region for which the second carrier is designated and (ii) the second delivery route being assigned to the second carrier.

6. The method of claim 1, wherein determining the cost of modifying the remaining portion of the first delivery route comprises:
  identifying that a pickup location for the additional order or the delivery location for the additional order is within the first geographic region for which the first carrier is designated; and
  applying a reduction to the cost of modifying the remaining portion of the first delivery route as a result of (i) the pickup location for the additional order or the delivery location for the additional order being within the first geographic region for which the first carrier is designated and (ii) the first delivery route being assigned to the first carrier.

7. The method of claim 1, wherein the cost of modifying the remaining portion of the first delivery route is based at least on an increase in distance of the first delivery route that results from including the additional delivery stop, an increase in travel time for the first delivery route that results from including the additional delivery stop, or an expected increase in charges from the first carrier that results from including the additional delivery stop.

8. The method of claim 1, further comprising generating the first delivery route by:
  selecting a group of orders;
  identifying delivery constraints for each order in the group of orders;
  providing data representing the group of orders and the delivery constraints to a routing engine; and
  obtaining the first delivery route from the routing engine, the first delivery route generated by the routing engine using the data representing the group of orders and the delivery constraints.

9. The method of claim 1, wherein the first geographic region and the second geographic region are adjacent to each other.

10. The method of claim 1, wherein the cost of modifying the remaining portion of the first delivery route is based at least in part on a distance between a point along the first delivery route and a pickup location or delivery location for the additional order.

11. The method of claim 1, wherein the cost of modifying the remaining portion of the first delivery route is based at least in part on the first carrier's ability to meet delivery constraints associated with other orders on the first delivery route.

12. One or more non-transitory computer-readable media having instructions stored thereon that, when executed by one or more processors of a computing system, cause the computing system to perform operations for modifying in-progress delivery routes, the operations comprising:
  identifying, by a routing management system, a first delivery route that includes delivery stops at multiple locations within a first geographic region;
  assigning the first delivery route to a first carrier that is designated to deliver orders within the first geographic region, and transmitting, by the routing management system, the first delivery route to a first carrier computing system of the first carrier for forwarding to a first driver device;
  identifying, by the routing management system, a second delivery route that includes delivery stops at multiple locations within a second geographic region;
  assigning the second delivery route to a second carrier that is designated to deliver orders within the second geographic region, and transmitting, by the routing management system, the second delivery route to a second carrier computing system of the second carrier for forwarding to a second driver device;
  while a first driver of the first carrier is performing the first delivery route and a second driver of the second carrier is performing the second delivery route:
    (i) receiving, by the routing management system, a request to deliver an additional order to an order location within the first geographic region;
    (ii) in response to receiving the request to deliver the additional order, determining, by the routing management system, a current location of the first driver of the first carrier relative to the order location, based on location data from a global positioning system (GPS) device of the first driver device;
    (iii) in response to receiving the request to deliver the additional order, determining, by the routing management system, a current location of the second driver of the second carrier relative to the order location, based on location data from a GPS device of the second driver device;
    (iv) determining, by the routing management system and based at least in part on the current location of the first carrier relative to the order location, and the current location of the second carrier relative to the order location, that a cost of modifying a remaining portion of the second delivery route to include an additional delivery stop for the additional order is less than a cost of modifying a remaining portion of the first delivery route to include the additional delivery stop for the additional order; and
  in response to determining that the cost of modifying the remaining portion of the second delivery route to include the additional delivery stop for the additional order is less than the cost of modifying the remaining portion of the first delivery route to include the additional delivery stop for the additional order, modifying, by the routing management system, the remaining portion of the second delivery route to include the additional delivery stop for the additional order, including;
    (i) assigning the additional order to the second carrier even though the second carrier is designated to deliver orders within the second geographic region rather than the first geographic region, and
    (ii) transmitting, by the routing management system, the modified remaining portion of the second delivery route to the second carrier computing system of the second carrier for forwarding to the second driver device.

13. The non-transitory computer-readable media of claim 12, the operations further comprising:
    determining the cost of modifying the remaining portion of the first delivery route by simulating a modified version of the first delivery route that incorporates the additional delivery stop for the additional order; and
    determining the cost of modifying the remaining portion of the second delivery route by simulating a modified version of the second delivery route that incorporates the additional delivery stop for the additional order.

14. The non-transitory computer-readable media of claim 12, wherein determining the cost of modifying the remaining portion of the second delivery route comprises:
    identifying that a pickup location for the additional order or the delivery location for the additional order is outside the second geographic region for which the second carrier is designated; and
    applying a penalty to the cost of modifying the remaining portion of the second delivery route as a result of (i) the pickup location for the additional order or the delivery location for the additional order being outside the second geographic region for which the second carrier is designated and (ii) the second delivery route being assigned to the second carrier.

15. The non-transitory computer-readable media of claim 12, wherein determining the cost of modifying the remaining portion of the first delivery route comprises:
    identifying that a pickup location for the additional order or the delivery location for the additional order is within the first geographic region for which the first carrier is designated; and
    applying a reduction to the cost of modifying the remaining portion of the first delivery route as a result of (i) the pickup location for the additional order or the delivery location for the additional order being within the first geographic region for which the first carrier is designated and (ii) the first delivery route being assigned to the first carrier.

16. The non-transitory computer-readable media of claim 12, wherein the cost of modifying the remaining portion of the first delivery route is based at least on an increase in distance of the first delivery route that results from including the additional delivery stop, an increase in travel time for the first delivery route that results from including the additional delivery stop, or an expected increase in charges from the first carrier that results from including the additional delivery stop.

17. A computer system comprising:
    one or more data processing apparatuses including one or more processors, memory, and storage devices storing instructions that, when executed, cause the one or more processors to perform operations for modifying in-progress delivery routes, the operations comprising:
    identifying, by a routing management system, a first delivery route that includes delivery stops at multiple locations within a first geographic region;
    assigning the first delivery route to a first carrier that is designated to deliver orders within the first geographic region, and transmitting, by the routing management system, the first delivery route to a first carrier computing system of the first carrier for forwarding to a first driver device;
    identifying, by the routing management system, a second delivery route that includes delivery stops at multiple locations within a second geographic region;
    assigning the second delivery route to a second carrier that is designated to deliver orders within the second geographic region, and transmitting, by the routing management system, the second delivery route to a second carrier computing system of the second carrier for forwarding to a second driver device;
    while a first driver of the first carrier is performing the first delivery route and a second driver of the second carrier is performing the second delivery route:
        (i) receiving, by the routing management system, a request to deliver an additional order to an order location within the first geographic region;
        (ii) in response to receiving the request to deliver the additional order, determining, by the routing management system, a current location of the first driver of the first carrier relative to the order location, based on location data from a global positioning system (GPS) device of the first driver device;
        (iii) in response to receiving the request to deliver the additional order, determining, by the routing management system, a current location of the second driver of the second carrier relative to the order location, based on location data from a GPS device of the second driver device;
        (iv) determining, by the routing management system and based at least in part on the current location of the first carrier relative to the order location, and the current location of the second carrier relative to the order location, that a cost of modifying a remaining portion of the second delivery route to include an additional delivery stop for the additional order is less than a cost of modifying a remaining portion of the first delivery route to include the additional delivery stop for the additional order; and
    in response to determining that the cost of modifying the remaining portion of the second delivery route to include the additional delivery stop for the additional order is less than the cost of modifying the remaining portion of the first delivery route to include the additional delivery stop for the additional order, modifying, by the routing management system, the remaining portion of the second delivery route to include the additional delivery stop for the additional order, including;
        (i) assigning the additional order to the second carrier even though the second carrier is designated to deliver orders within the second geographic region rather than the first geographic region, and
        (ii) transmitting, by the routing management system, the modified remaining portion of the second delivery route to the second carrier computing system of the second carrier for forwarding to the second driver device.

18. The computer system of claim 17, the operations further comprising:
    determining the cost of modifying the remaining portion of the first delivery route by simulating a modified version of the first delivery route that incorporates the additional delivery stop for the additional order; and
    determining the cost of modifying the remaining portion of the second delivery route by simulating a modified version of the second delivery route that incorporates the additional delivery stop for the additional order.

19. The computer system of claim 17, wherein determining the cost of modifying the remaining portion of the second delivery route comprises:
- identifying that a pickup location for the additional order or the delivery location for the additional order is outside the second geographic region for which the second carrier is designated; and
- applying a penalty to the cost of modifying the remaining portion of the second delivery route as a result of (i) the pickup location for the additional order or the delivery location for the additional order being outside the second geographic region for which the second carrier is designated and (ii) the second delivery route being assigned to the second carrier.

20. The computer system of claim 17, wherein determining the cost of modifying the remaining portion of the first delivery route comprises:
- identifying that a pickup location for the additional order or the delivery location for the additional order is within the first geographic region for which the first carrier is designated; and
- applying a reduction to the cost of modifying the remaining portion of the first delivery route as a result of (i) the pickup location for the additional order or the delivery location for the additional order being within the first geographic region for which the first carrier is designated and (ii) the first delivery route being assigned to the first carrier.

21. The computer system of claim 17, wherein the cost of modifying the remaining portion of the first delivery route is based at least on an increase in distance of the first delivery route that results from including the additional delivery stop, an increase in travel time for the first delivery route that results from including the additional delivery stop, or an expected increase in charges from the first carrier that results from including the additional delivery stop.

* * * * *